US 6,650,680 B2

(12) United States Patent
Zeller (10) Patent No.: US 6,650,680 B2
(45) Date of Patent: Nov. 18, 2003

(54) GAS LASER WITH COOLED COAXIAL ELECTRODE TUBES

(75) Inventor: Thomas Zeller, Sindelfingen (DE)

(73) Assignee: Trumpf Lasertechnik GmbH, Ditzingen (DE)

(*) Notice: Subject to any disclaimer, the term of this patent is extended or adjusted under 35 U.S.C. 154(b) by 94 days.

(21) Appl. No.: 09/960,542

(22) Filed: Sep. 21, 2001

(65) Prior Publication Data

US 2002/0071466 A1 Jun. 13, 2002

(30) Foreign Application Priority Data

Sep. 22, 2000 (DE) .......................... 100 47 020

(51) Int. Cl.[7] .......................... H01S 3/04; H01S 3/223; H01S 3/097
(52) U.S. Cl. .......................... 372/87; 372/55; 372/34; 372/35; 372/88
(58) Field of Search .......................... 372/87, 55, 34, 372/35, 88, 38.05, 102

(56) References Cited

U.S. PATENT DOCUMENTS 4,649,547 A * 3/1987 Carlson et al. ............... 372/61
4,752,937 A * 6/1988 Gorisch et al. ............... 372/35

* cited by examiner

*Primary Examiner*—Paul Ip
*Assistant Examiner*—Armando Rodriguez

(57) ABSTRACT

A laser has at least two coaxial electrode tubes spaced apart to provide a laser cavity therebetween and a cooling system including cooling coils about the outer surface of the outer electrode and about the inner surface of the inner electrode and in heat exchange contact therewith. Support pipes are provided about the outside of the outside cooling coil and about the inside surface of the inner cooling coil. The cooling coils are deformed into improved heat exchange contact with the electrode tubes by internal pressure and may be softened by annealing or the like before the application of the deformation pressure.

20 Claims, 5 Drawing Sheets

GAS LASER WITH COOLED COAXIAL ELECTRODE TUBES

The invention concerns a laser with at least two electrode tubes, whose axes run rectilinearly and one of which is the inner electrode tube and is arranged inside the other outer electrode tube, forming an intermediate annular space serving as the discharge space, and with a cooling device with a wall that has at least one inner coolant line placed inside the inner electrode tube and/or at least one outer coolant line with a wall placed outside the outer electrode tube, whereby the inner and/or outer coolant lines have a heat-transfer connection on their walls with the electrode tube assigned to them. The invention also concerns a process for producing this type of laser with at least one plastically deformable inner coolant line and/or at least one plastically deformable outer coolant line. Finally, the invention concerns a device for carrying out the production process just mentioned.

As is known, the laser process that takes place in the discharge space of a laser is associated with the development of heat, which must be taken away so the whole arrangement can function. This heat can be discharged by cooling the laser electrodes.

A corresponding electrode of the type mentioned at the beginning, in the form of a laser with a coaxial design, is disclosed in DE-U-299 12 670. The cooling device of this laser has an inner cooling coil as the inner coolant line and an outer cooling coil as the outer coolant line. Both cooling coils are formed by a round tube curved coaxially with the electrode tubes, which is molded with linear contact to the generating surface of the electrode tube assigned to it parallel to the axis facing it. When the previously known laser is produced, the round tubes for the coolant lines are curved into coils by mandrels. The diameters of the mandrels are chosen so that the inner cooling coil has an outer diameter that corresponds to the inner diameter of the inner electrode tube and the outer cooling coil has an inner diameter that corresponds to the outer diameter of the outer electrode tube. Then, the inner cooling coil is pushed inside the inner electrode tube, and the outer cooling coil is pushed onto the outer casing of the outer electrode tube. In the case of a non-generic laser design previously known from practical applications, coil-like grooves are milled directly into the walls of the electrode tube and are used as paths through which the coolant flows when the laser is in operation.

The goal of this invention is to create a laser that guarantees effective cooling of the discharge space between the electrode tubes with structurally simple technical production measures. Another goal of the invention is to provide a corresponding simple production process and a device for carrying out this type of simple production process.

SUMMARY OF THE INVENTION

It has now been found that the foregoing and related objects may be readily obtained in a laser tube assembly including at least two rectilinear coaxial electrode tubes spaced apart to provide an annular space therebetween serving as the discharge cavity for the lasing gas. At least one coolant line extends about the surface of an electrode tube spaced from the discharge cavity and having a first surface in heat transfer assembly with the electrode tube assigned to it. A support device is provided on the other surface of the coolant line.

Generally, coolant lines are provided about the outer surface of the outer electrode tube and about the inner surface of the inner electrode tube, and support devices are provided on the outer surface of the outer coolant line and on the inner surface of the inner coolant line.

The support devices are cylindrical pipes with axes coaxial with that of the electrode tubes. The inner coolant line is kept in surface contact with the inner electrode tube by means of the inner support device and the outer coolant line is kept in surface contact with the outer electrode tube by means of the outer support device.

Preferably, said coolant lines are provided by helical coils of tubing which have a non-round cross section providing a surface portion conforming to and in surface contact with the wall of said electrode tubes to improve heat transfer. Conveniently, the support devices are cylindrical pipes and the coolant lines are in surface contact with the pipes.

The laser is produced by a process in which at least two rectilinear and coaxial electrode tubes are assembled in spaced apart relationship to provide an annular space therebetween serving as the discharge cavity. A cooling device is included and includes at least one coolant line extending about the surface of the electrode tube spaced from the discharge cavity, and a support device is provided about the surface of the coolant line spaced from its associated electrode tube. The cooling line has a plastically deformable wall, and a fluid under pressure is provided in the coolant line to deform the wall of the coolant line plastically into heat exchange contact with the assigned electrode tube or a surface that has a heat transfer connection with it.

Desirably, the wall of the coolant line are softened before it is subjected to deformation by the fluid under pressure. The softening of the cooling line is effected by heating, and preferably by annealing.

Preferably, the inner coolant line and outer coolant line have support end pieces and the walls of the inner coolant line and the walls of the outer coolant line are softened only in the area between the support end pieces before being acted on by the inner deformation pressure.

The fluid under pressure may be the medium later used as a coolant. Preferably, the coolant lines have a rectangular or oval cross section before being acted upon by the fluid under pressure. The support devices may remain as a part of the laser after the laser is produced.

By means of the inner and/or outer support device in patent claim 1, the inner and outer coolant lines are kept in close contact which is favorable for effective heat transfer with the assigned electrode tube directly or with a surface that in turn has a heat-transfer connection with the electrode tube in question. The process measures of pressure deformation allows the close contact sought for effective heat transfer between the inner and outer coolant lines and the assigned electrode tubes or assigned surfaces to be made in a way that is technically simple to produce. This makes it possible, in particular, to adjust the shape of the walls of the coolant lines by corresponding plastic deformation to the shape of the opposing electrode surface being cooled and thus produce a large surface area of close contact between coolant lines and the surfaces opposite them. This is a special advantage in the case of coolant lines whose cross section before the plastic deformation mentioned deviates somewhat from the ideal shape as a result of tooling-related deformation. In the sense of the invention, after the respective coolant line is deformed and its shape stabilized, the inner and outer support devices can remain on the laser or can be removed from the laser.

The use of an inner support tube as the inner support device and an outer support tube as the outer support device is recommended, since this ensures effective support of the coolant lines over a large surface on the side away from the accompanying electrode tubes and thus also especially effective placement of that coolant line on the opposite surface used for heat transfer.

The plastic deformation of the inner and/or outer coolant line is basically limited to the part of the line between the support end pieces of the coolant lines. The end pieces of the coolant lines mentioned can therefore be used without major prior tooling as connecting supports for supplying the laser with coolant.

If the deformation pressure for plastic deformation of the coolant lines is produced by means of a pressurized medium, which, depending on its type, is used as a coolant in later laser operation, then the expensive measures for cleaning the coolant lines after their deformation and before the laser is put into operation are unnecessary.

The process of the invention is very simple to design using coolant lines that have a rectangular or oval cross section before they are acted on with the inner deformation pressure. Before these types of coolant lines are deformed, if they are aligned in relation to the accompanying opposite surface used for heat transfer in such a way that the greatest possible surface area of their walls extends parallel to the opposite surface in question, then it takes only a relatively slight plastic deformation of the coolant lines for close contact with the surface being cooled over a large area.

The support devices can be used directly as support devices for the coolant lines of the finished laser, so it is not necessary to disassemble the support devices of the production jig. This is particularly significant since the coolant lines act on the support devices in their plastic deformation and their disassembly can consequently be difficult.

BRIEF DESCRIPTION OF THE DRAWINGS

The invention will be described in greater detail below using schematic drawings as examplary.

DETAILED DESCRIPTION OF THE ILLUSTRATED EMBODIMENTS

Figure 1:
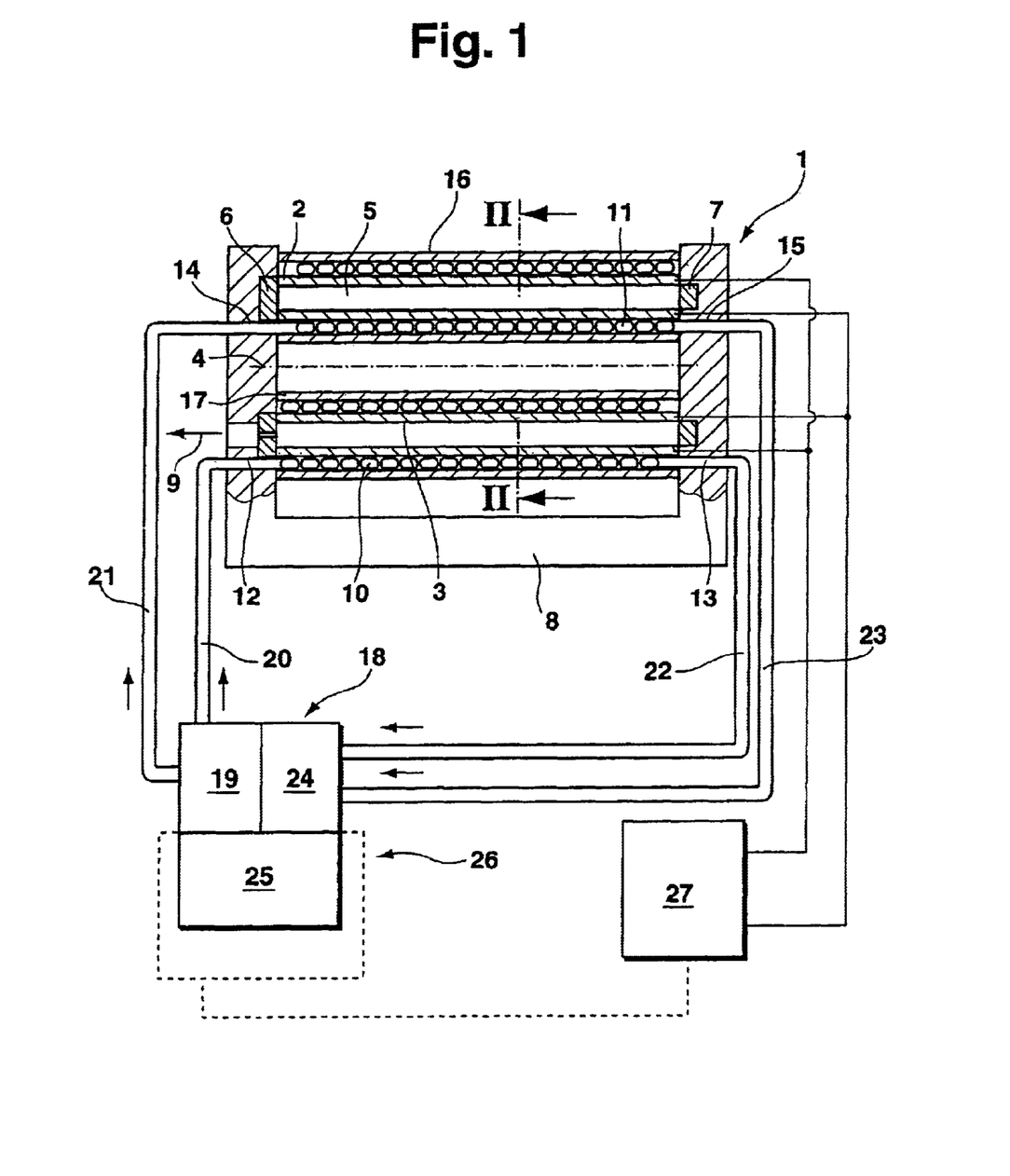
FIG. 1 is a diagrammatic illustration in partial section of a laser a embodying the present invention.
Figure 2:
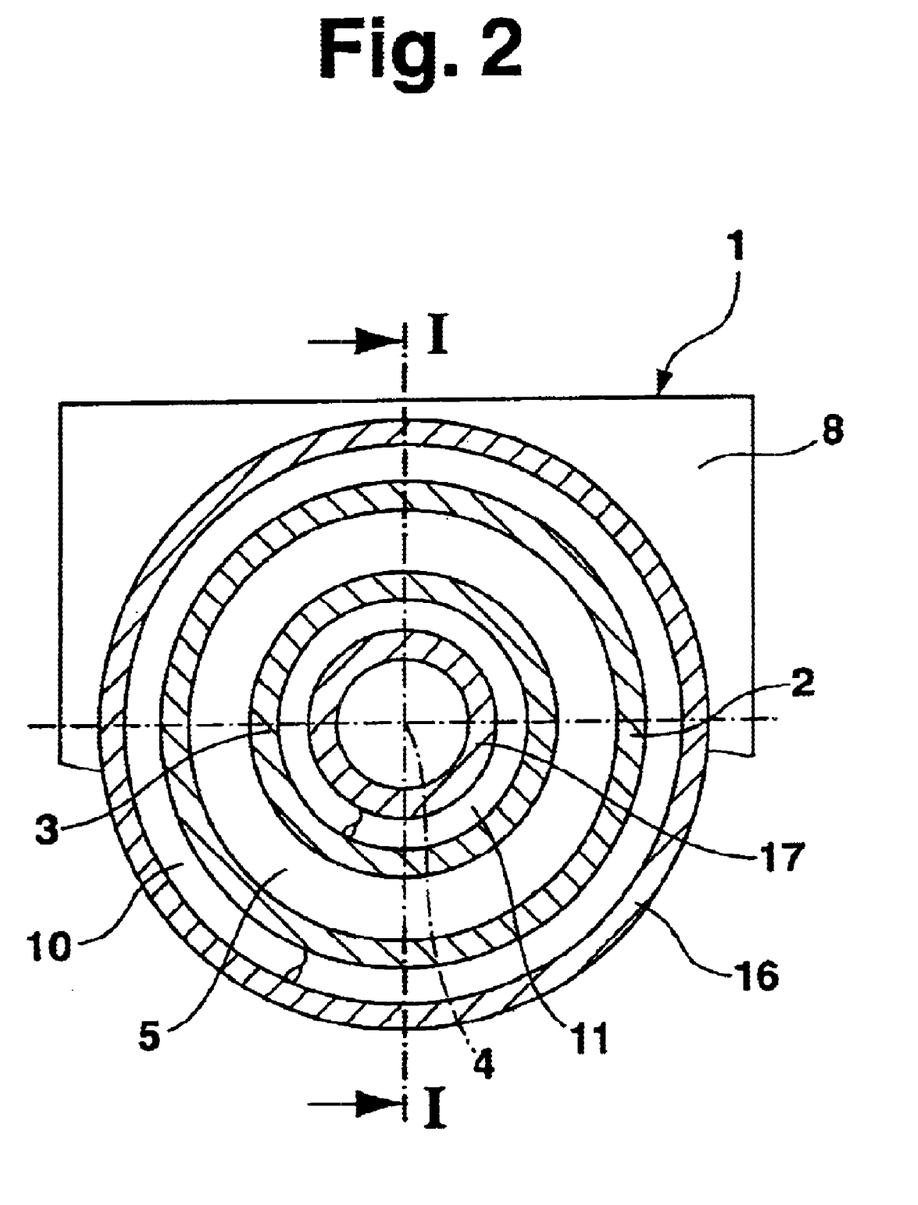
FIG. 2 is a sectional view of the laser in FIG. 1 along the line II—II.

According to FIGS. 1 and 2, the laser 1 has excitation electrodes in the form of two spaced apart coaxial electrode tubes 2, 3. The plane of projection in FIG. 1 runs through line I—I in FIG. 2, and the plane of projection in FIG. 2 runs through line II—II in FIG. 1. The common axis of the electrode tubes 2, 3 is given the reference number 4.

Electrode tube 3 is the inner electrode tube and is disposed within outer electrode tube 2. As a result of the spacing between electrode tubes 2, 3 in the radial direction, there remains between them a discharge space 5 in the form of an annular intermediate cavity. As the laser active medium, the discharge space 5 contains $CO_2$; CO can also be used, for example, instead of $CO_2$. Resonator mirror assemblies 6, 7 are at opposite ends of the discharge space 5 in its axial direction. The resonator mirror assemblies 6, 7 are provided on a common mirror holder 8 and are designed in the shape of a circular ring or annulus. The circular ring-shaped mirror surfaces of the resonator mirror arrangements 6,7 lie in a plane that is perpendicular to the axis 4 of the electrode tubes 2,3. The resonator mirror assembly 6 has an exit aperture for the laser beam 9.

An outer coolant line 10 extends about the outer surface of the electrode tube 2 and parallel to the axis 4 of the tubes 2, 3. An inner coolant line 11 is provided about the inner surface of the electrode tube 3. Both the outer coolant line 10 and the inner coolant line 11 are provided by a spiral coil of copper tubing with a flattened round cross section. The axes of the coils coincide with the axis 4 of the electrode tubes 2,3. The outer coolant line 10 extends into support end pieces 12, 13, and the inner coolant line 11 extends into support end pieces 14, 15.

On the outside of the coiled outer coolant line 10 is an outer support pipe or cylinder 16, and on the inside of the coiled inner coolant line 11 is an inner support pipe or cylinder 17. The outer support pipe 16 and the inner support pipe 17 are aligned coaxially with the electrode tubes 2, 3.

The outer coolant line 10 is clamped in the radial direction between the outer support pipe 16 and the outer electrode tube 2. As a result, there is close contact between the outer coolant line 10 and the outer surface of electrode tube 2 parallel to the axis and facing it. In corresponding fashion, the inner coolant line 11 is kept in close contact with the inner surface of the inner electrode tube 3 facing it by means of the inner support pipe 17.

The relationships described guarantee effective heat transfer from the electrode tubes 2,3, which heat up during the laser operation, into the cooling medium, here water, flowing through the outer coolant line 10 and the inner coolant line 11. In the sense of extensive heat discharge from the inside of the discharge space 5, the circumstances result in the fact that the outer coolant line 10 and the inner coolant line 11, because of the shape of their cross section, have relatively large surface areas of their walls in contact with the electrode tubes 2,3 being cooled.

The outer coolant line 10 and the inner coolant line 11 are parts of a cooling system 18 for the laser 1. The cooling device 18 also includes a circulating pump 19, which is connected by the feed line 20 to the support end piece 12 of the outer coolant line 10 and by a feed line 21 to the support end piece 14 of the inner coolant line 11. Through the feed lines 20, 21 and the support end pieces 12, 14, the cooling water used comes out of the circulating pump 19 and goes into the coiled coolant lines 10, 11. In its helical path around the outer electrode tube 2 and the inner electrode tube 3, the cold water absorbs the heat coming from the discharge space 5 before it leaves the outer coolant line 10 in its support end piece 13 and the inner coolant line 11 in its support end piece 15. This makes the coolant lines 10, 11 part of an internal heat exchanger for the laser 1. The heated water is returned to an outer heat exchanger or cooler 24 by return lines 22, 23. Thus, after it passes the electrode tubes 2,3, the heated water is taken through the heat exchanger 24 and cooled before it is then transported by the circulating pump 19 back to the coiled coolant lines 10, 11.

The cooling capacity of the cooling device 18 is controlled by computerized cooling system controls. The cooling system control 25 is in turn an integral part of the computerized control 26 of the processing machine in which the laser 1 is installed, which may be a laser cutting machine for cutting sheet metal. A high-frequency (HF) generator 27 is also connected to the computerized control 26, and a high-frequency alternating current is applied to the electrode tubes 2,3, as is well known, to produce the lasing action in the gas in the discharge space 5.

Figure 3A:
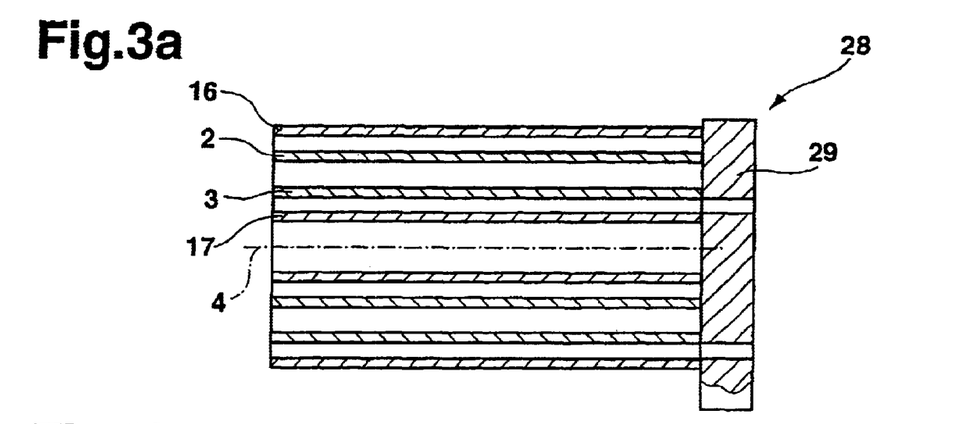
FIGS. 3a, 3b & 3c are views of the components of the laser of FIGS. 1 and 2 at various phases in its production.
Figure 3B:
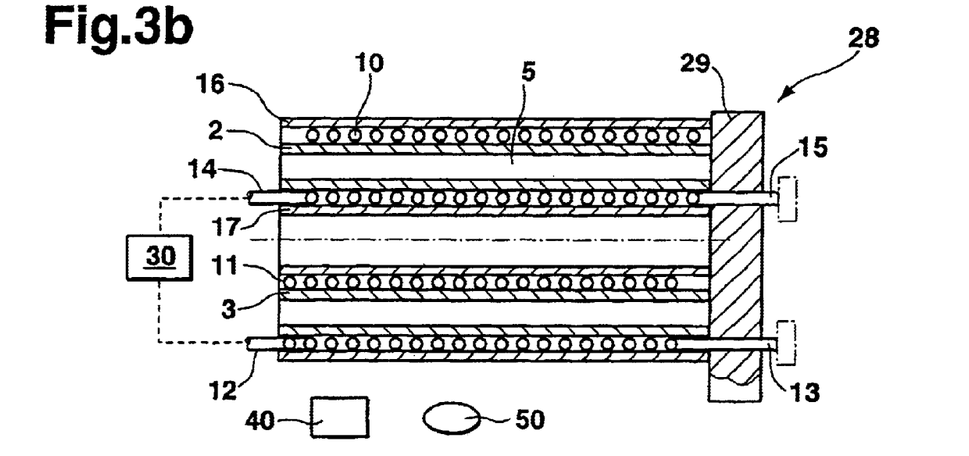
Figure 3C:
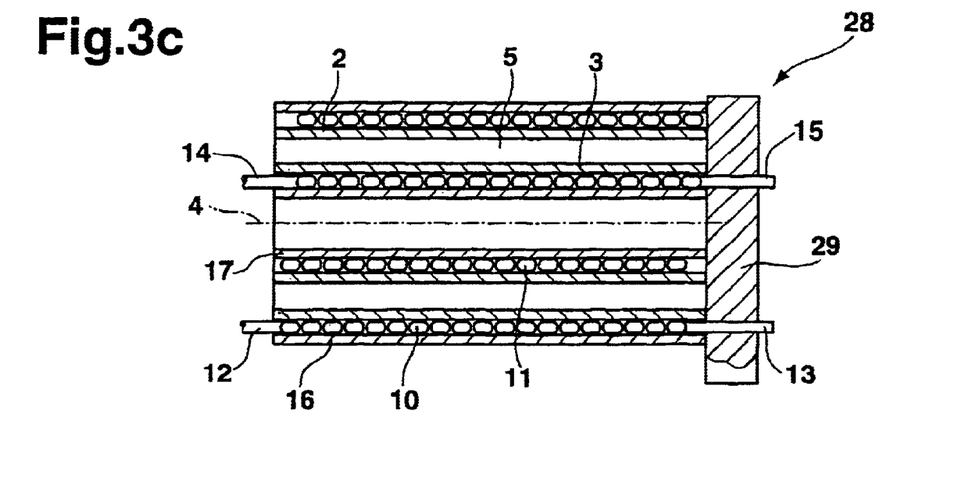

The laser is assembled as schematically shown in FIGS. 3a, 3b and 3c. In FIG. 3a, a jig or support 28 has a holder 29 on which the outer supporting pipe 16, the inner supporting pipe 17, the outer electrode tube 2 and the inner electrode tube 3 are assembled coaxially so they can be detached. A first length of copper tubing with a circular cross section is formed into a spiral coil over a mandrel whose outer diameter corresponds roughly to the outer diameter of the outer electrode tube 2. The ends of the length provide support end pieces 12, 13 which remain rectilinear. Correspondingly, a second length of copper tubing with a circular cross section is formed over a mandrel with the outer diameter of the inner electrode tube 3 into a second coil with rectilinear support end pieces 14, 15. The coil with the larger diameter forms the outer coolant line 10 in the starting position; the coil with the smaller diameter forms the inner coolant line 11 in the starting position.

The coil with the larger diameter is pushed into the annular intermediate space between the outer support pipe 16 and the outer electrode tube 2, and the coil with the smaller diameter is pushed into the annular space between the inner electrode tube 3 and the inner support pipe 17. This produces the subassembly seen in FIG. 3b. The support end pieces 12, 13, 14, 15 of the two coils extend outwardly of the pipes 17, 19 and through the openings in the holder 29, and are very accessible by the other structural elements of the laser 1.

FIG. 3b shows a preferred configuration in which the copper tubing initially has a circular cross section and keeps its original shape in cross section when bent into coils. However, in practice, it is frequently observed that the wall of the coiled tubing is deformed in their cross section due to machining and may flatten into a kidney-shaped cross section. FIG. 3b also shows copper tubing 40, 50 with square or oval cross sections a which can also be used for the coolant lines 10, 11.

Starting from the mounting phase in FIG. 3b, the two coils, i.e., coolant lines 10, 11 in the starting state, are heated inductively in the area between the support-like end pieces 12, 13, 14, 15 and thereby annealed. Then the support end piece 13 of the outer coolant line 10 and the support end piece 15 of the inner coolant line 11 are closed tightly as shown in dashes in FIG. 3b, and the support end pieces 12, 14 are connected to the high pressure pump 30. The latter is used as the source of pressurized water. By means of this pressurized water, inner deformation pressure is produced inside the softened outer coolant line 10 and inside the softened inner coolant line 11. By means of this deformation pressure, the outer coolant line 10 and the inner coolant line 11 are deformed by internal high-pressure shaping. The electrode tubes 2,3 next to them, on one hand, and the supporting pipes 16, 17, on the other hand, counteract radial expansion of the crows section, of the outer coolant line 10 and the inner coolant line 11. Finally, starting from the original pipe cross sections, the flattened round cross sections of the coolant lines 10, 11 shown in FIG. 3c are produced. The scope of the cross section deformation to be achieved depends on the shape of the initial cross section of the tubing to be deformed plastically. In the case of an oval initial cross section (part 50 in FIG. 3b), it takes less cross sectional deformation to produce the tubing cross section in FIG. 3c than it does for an initial cross section which is circular.

As a result of the cross section elongation due to the effect of the inner deformational pressure, the outer coolant line 10 between the outer supporting pipe 16 and the outer electrode tube 2, and the inner coolant line 11 between the inner electrode tube 3 and the inner support pipe 17, are clamped or fixed in the radial direction. The coolant lines 10, 11 are in close contact with their walls over large surfaces, especially with the electrode tubes 2,3 being cooled during laser operation.

After the plastically deformed coolant lines 10, 11 are cooled and their shapes are stabilized, the whole subassembly of electrode tubes 2,3, coolant lines 10, 11 and support pipes 16, 17 is taken out of the jig or holder 29 of the production device 28 and is assembled with other components to provide the laser in FIG. 1.

As an alternative to the manufacturing sequence described above, it is also possible that, after the shape of the plastically deformed coolant lines 10, 11 is stabilized, the support pipes 16, 17 are removed from them, and the remaining components are then mounted into a laser which does not have support pipes of the type mentioned.

Figure 4:
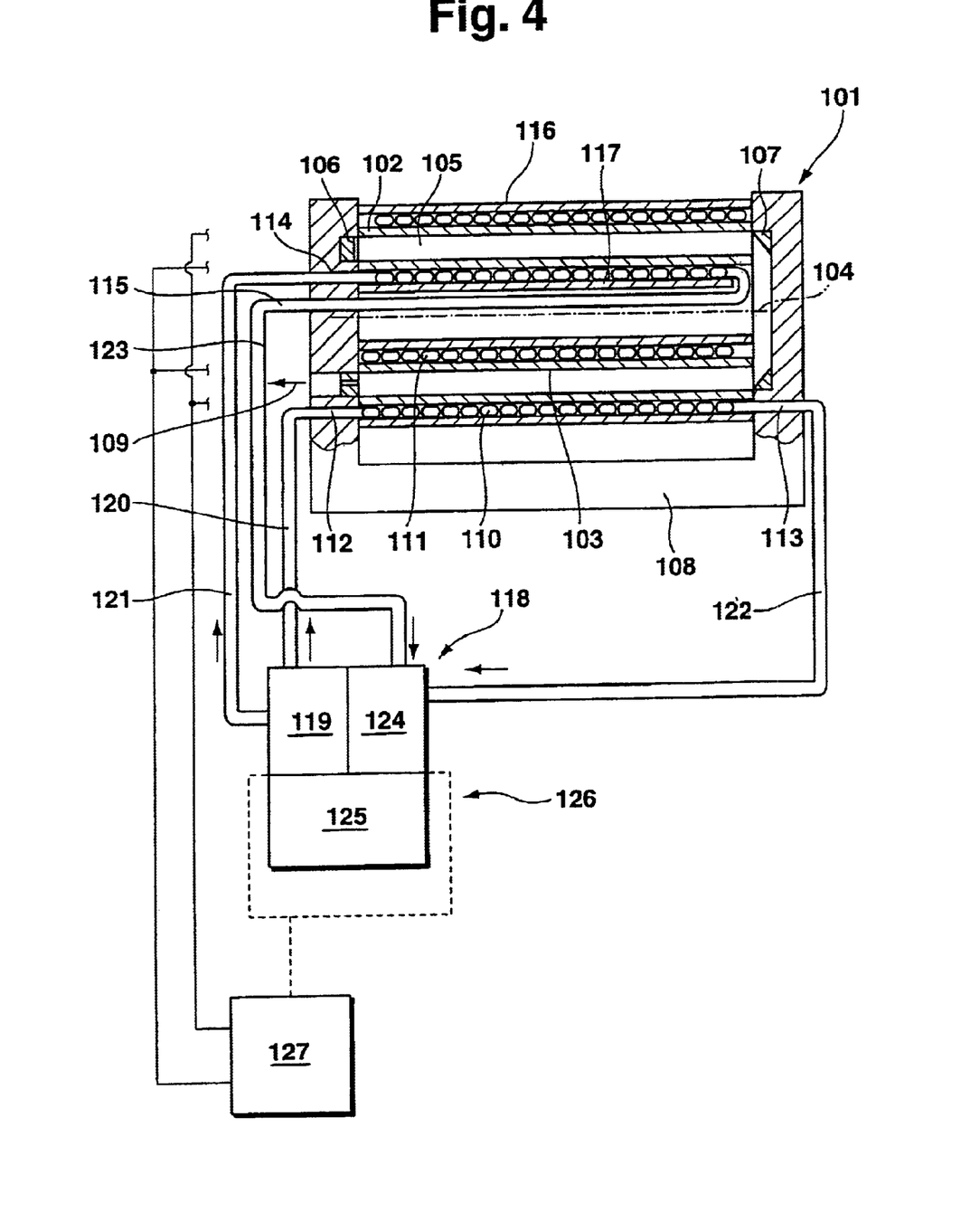
FIG. 4 is a diagrammatic illustration in partial section of another embodiment of the laser of the present invention.

As shown in FIG. 4, a laser 101 is largely structurally identical to the laser 1 described above. The components corresponding to the components in FIGS. 1 to 3 are given the reference numbers of FIGS. 1–3, plus 100.

Figure 5:
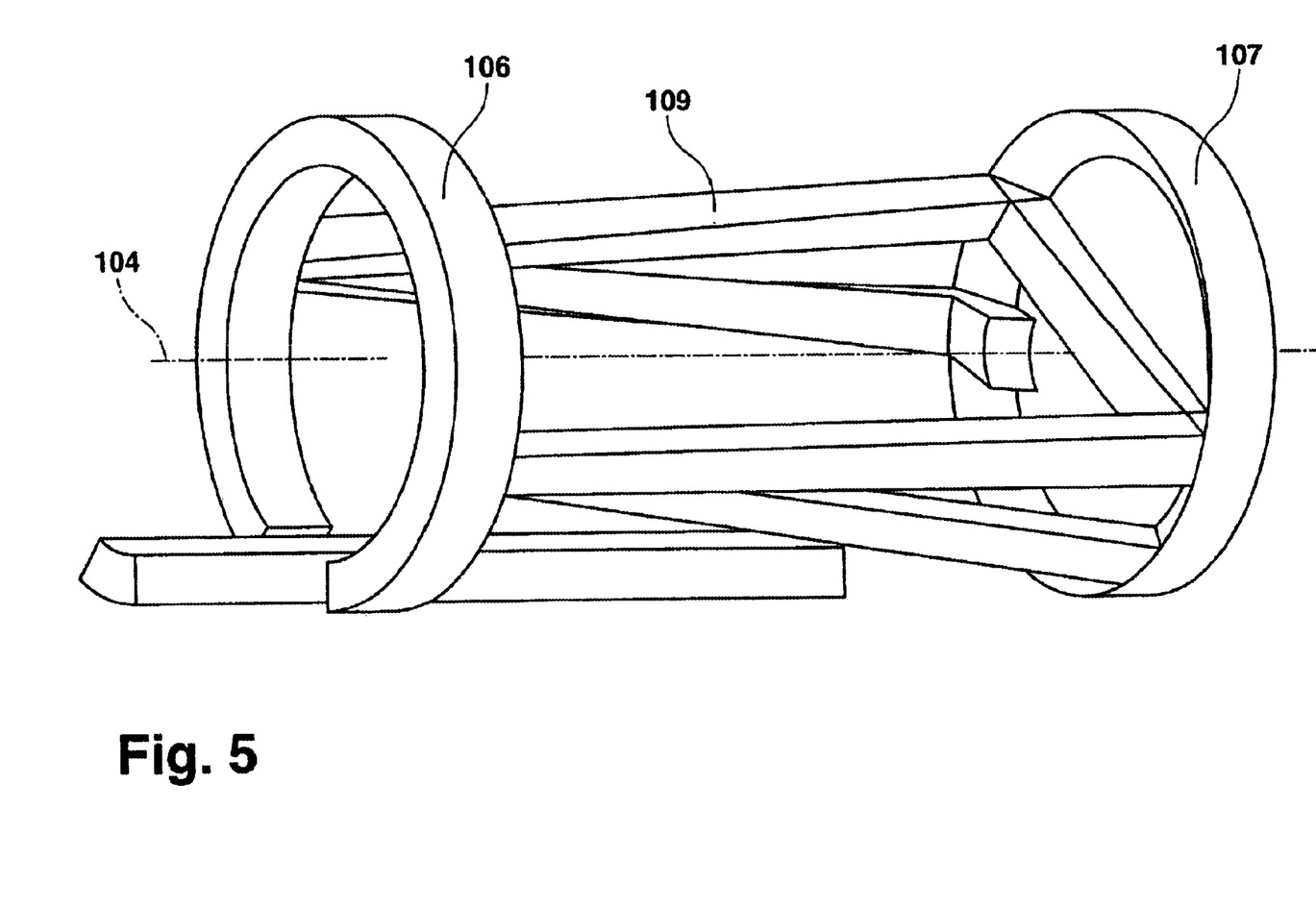
FIG. 5 shows the path of the laser beam in the laser of FIG. 4.

As can be seen in FIG. 5, the resonator mirror assembly 107 has a conical mirror surface; the mirror surface of the resonator mirror assembly 106 extends helically around the axis 104 of the discharge space 105 shown in dashes. As a result of the configuration of the resonator mirror assemblies 106, 107, the path of the laser beam 109 shown in FIG. 5 is set for the laser 101. On the resonator mirror assembly 107, the laser beam 109 runs, inter alia, also diametrically through the inner space, circular in cross section, of the conical mirror surface. This inner space must consequently be kept free for the laser beam 109. For this purpose, the inner coolant line 111 runs as shown in FIG. 4. The support end pieces 114, 115 of the inner coolant line 111 accordingly go through one and the same leg of the mirror holder 108. Then, on its coiled section, the inner coolant line 111 is fed through the inner support pipe 117, before it extends inside the inner support pipe 117 in its axial direction.

When the laser 101 is produced, unlike the process sequence described in FIGS. 3a to 3c, the inner support pipe 117 is pushed inside the inner electrode 103 with the inner coolant line 111 coiled on its inner surface.

What is claimed is:
1. A coaxial laser tube assembly comprising
   (a) at least two rectilinear coaxial electrode tubes spaced apart to provide an annular space in between the inner and outer electrode tubes to serve as the discharge cavity for the lasing gas;
   (b) at least one coolant line extending about the surface of at least one of said electrode tubes spaced from the discharge cavity, said at least one coolant line having a first surface portion deformed into surface contact and thereby in heat transfer assembly with the electrode tube; and
   (c) a support device about a second surface portion of said at least one coolant line.
2. The coaxial laser tube assembly in accordance with claim 1 wherein inner and outer coolant lines are provided about, respectively, the outer surface of the outer electrode tube and about the inner surface of the inner electrode tube, and wherein support devices are provided on the outer surface portion of said outer coolant line and on the inner surface portion of said inner coolant line.
3. The coaxial laser tube assembly in accordance with claim 1, wherein said support device is a cylindrical pipe with its axis coaxial with the electrode tubes.
4. The coaxial laser tube assembly in accordance with claim 2 wherein the inner coolant line is kept in surface contact with said inner electrode tube by means of the inner support device and the outer coolant line is kept in surface contact with said outer electrode by means of the outer support device.

5. The coaxial laser tube assembly in accordance with claim 1 wherein said coolant lines are provided by helical coils of tubing.

6. The coaxial laser tube assembly in accordance with claim 5 wherein said tubing coils have a non-round cross section providing said first surface portion conforming to and in surface contact with the wall of said electrode tubes to improve heat transfer.

7. The coaxial laser tube assembly in accordance with claim 6 wherein said support devices are cylindrical pipes.

8. The coaxial laser tube assembly in accordance with claim 7 wherein said second surface of said coolant lines are in surface contact with said pipes providing said support devices.

9. A process for producing a coaxial laser tube assembly comprising the steps of: (a) assembling coaxially two rectilinear electrode tubes in spaced apart relationship to provide an annular space in between the inner and outer electrode tubes to serve as the discharge cavity for the lasing gas; (b) providing a cooling device including at least one coolant line with a first surface extending about the surface of at least one of said electrode tubes spaced from the discharge cavity; (c) providing a support device about a second surface of said at least one coolant line spaced from the associated electrode tube, said at least one cooling line having a plastically deformable wall; and (d) providing a fluid under pressure in said at least one coolant line to deform the wall of said at least one coolant line plastically into surface contact and thereby in heat exchange contact with the assigned electrode tube or a surface that has a heat transfer connection with it.

10. The process for producing a coaxial laser tube assembly in accordance with claim 9 wherein outer and inner coolant lines are provided, respectively, about the outer surface of said outer electrode tube and the inner surface of said inner electrode tube and support devices axe provided for each of said coolant lines.

11. The process for producing a coaxial laser tube assembly in accordance with claim 9 wherein said support devices are cylindrical pipes.

12. The process for producing a coaxial laser tube assembly in accordance with claim 9 including the step of softening the walls of the coolant line before they are subjected to deformation by the fluid under pressure.

13. The process for producing a coaxial laser tube assembly in accordance with claim 9 wherein the softening of said cooling line is effected by heating.

14. The process for producing a coaxial laser tube assembly in accordance with claim 13 wherein the softening of said wall is effected by annealing.

15. The process for producing a coaxial laser tube assembly in accordance with claim 10, whereby said inner coolant line and said outer coolant line have support end pieces and wherein the walls of the inner coolant line and the walls of the outer coolant line are softened only in the area between said support end pieces before being acted on by the inner deformation pressure.

16. The process for making a coaxial laser tube assembly in accordance with claim 9 wherein the fluid under pressure is the medium later used as a coolant.

17. The process for making a coaxial laser tube assembly in accordance with claim 9 wherein the coolant lines have a rectangular or oval cross section before being acted upon by the fluid under pressure.

18. The process for making a coaxial laser tube assembly in accordance with claim 10 wherein the inner and outer coolant line are plastically deformed.

19. The process for making a coaxial laser tube assembly in accordance with claim 10 wherein the support devices are coaxial pipes.

20. The process for making a coaxial laser tube assembly in accordance with claim 10 wherein said support devices remain as a part of the laser after the laser tube assembly is produced.

* * * * *

UNITED STATES PATENT AND TRADEMARK OFFICE
CERTIFICATE OF CORRECTION

PATENT NO.   : 6,650,680 B2
DATED        : November 18, 2003
INVENTOR(S)  : Thomas Zeller It is certified that error appears in the above-identified patent and that said Letters Patent is hereby corrected as shown below:

<u>Column 7,</u>
Line 40, "axe" should be -- are --

Signed and Sealed this

Twentieth Day of January, 2004

JON W. DUDAS
*Acting Director of the United States Patent and Trademark Office*